United States Patent
Inoue et al.

(10) Patent No.: US 6,262,957 B1
(45) Date of Patent: *Jul. 17, 2001

(54) METHOD AND APPARATUS FOR AUTOMATICALLY DISCRIMINATING TYPES OF OPTICAL DISKS

(75) Inventors: Shigeki Inoue, Fujisawa; Hiroshi Minoda, Yokohama; Hiroyuki Tanaka, Fujisawa; Akio Fukushima; Kazuhiko Ono, both of Yokohama, all of (JP)

(73) Assignee: Hitachi, LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,127

(22) Filed: May 27, 1997

(30) Foreign Application Priority Data

May 30, 1996 (JP) .................................................. 8-136709
Jul. 5, 1996 (JP) .................................................. 8-176629

(51) Int. Cl.$^7$ ...................................................... G11B 7/00
(52) U.S. Cl. ...................................... 369/53.23; 369/53.22
(58) Field of Search .............................. 369/58, 54, 94, 369/44.27, 124, 110, 112, 44.23, 118

(56) References Cited

U.S. PATENT DOCUMENTS

| | | |
|---|---|---|
| 5,452,278 | 9/1995 | Kwon et al. . |
| 5,513,170 | 4/1996 | Best et al. . |
| 5,615,200 * | 3/1997 | Hoshino et al. .................. 369/44.37 |
| 5,665,957 * | 9/1997 | Lee et al. ............................. 369/58 |
| 5,687,154 * | 11/1997 | Tsuchiya et al. ................... 369/112 |
| 5,729,510 * | 3/1998 | Kasahara et al. ................ 369/44.23 |
| 5,742,575 * | 4/1998 | Yamakawa et al. .................. 369/58 |
| 5,856,965 * | 1/1999 | Tsuchiya et al. ................... 369/110 |

FOREIGN PATENT DOCUMENTS

| | | |
|---|---|---|
| 0 470 807 A1 | 2/1992 | (EP) . |
| 61-180935 | 8/1986 | (JP) . |
| 3-116442 | 5/1991 | (JP) . |
| 4-95224 | 3/1992 | (JP) . |
| 8-339569 | 12/1996 | (JP) . |
| 62-076061 | 4/1997 | (JP) . |
| 290686 | 11/1996 | (TW) . |

OTHER PUBLICATIONS

Patent Abstracts of Japan, vol. 016, No. 323 (P–1386), Jul. 15, 1992 & JP 04 09524 A, Mar. 27, 1992.

* cited by examiner

*Primary Examiner*—Thang V. Tran
(74) *Attorney, Agent, or Firm*—Antonelli, Terry, Stout & Kraus, LLP

(57) ABSTRACT

An optical disk apparatus for reproducing or recording and reproducing two or more sorts of optical disks whose recording plane heights are different is arranged to reproduce or record data from or on the optical disk transparently to the user and without the users intricate operations. For this purpose, the optical disk apparatus provides a disk discriminating circuit for discriminating the disks whose recording plane heights are different. The disk discriminating circuit operates to discriminate the disk before reproducing or recording the disk mounted to the optical disk apparatus and switch the optical system and the circuit system to the suitable ones to the discriminated disk and then reproduce or record the data from or on the disk.

12 Claims, 10 Drawing Sheets

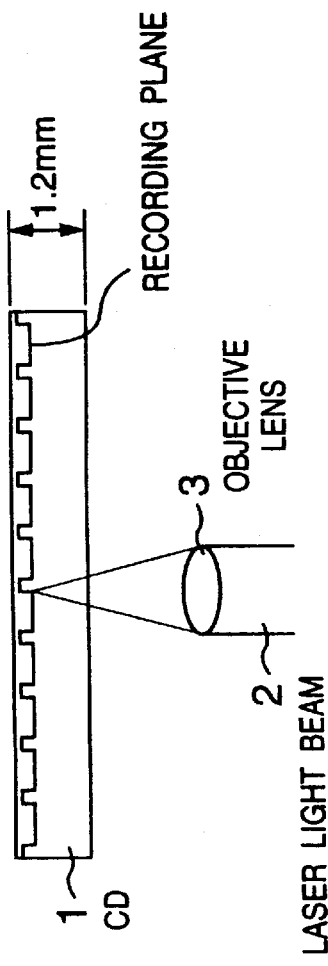
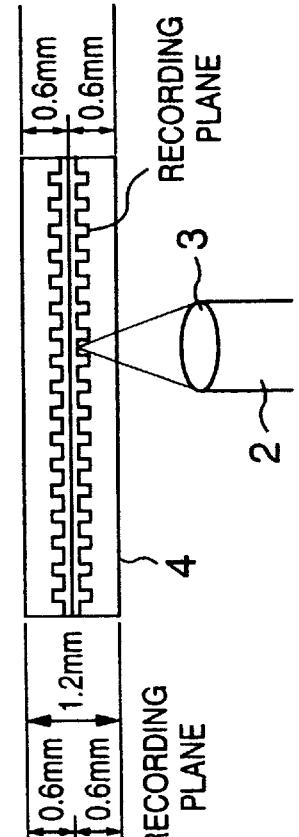
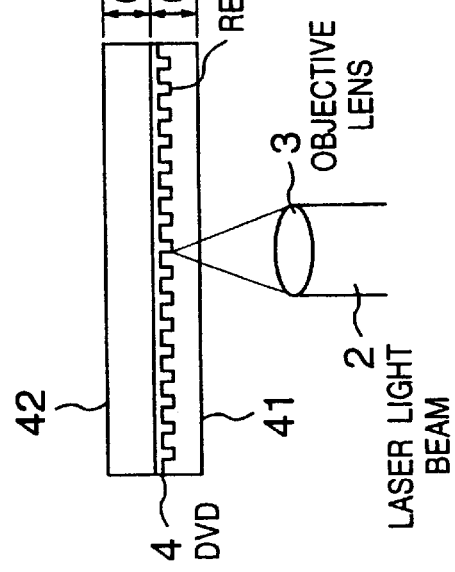

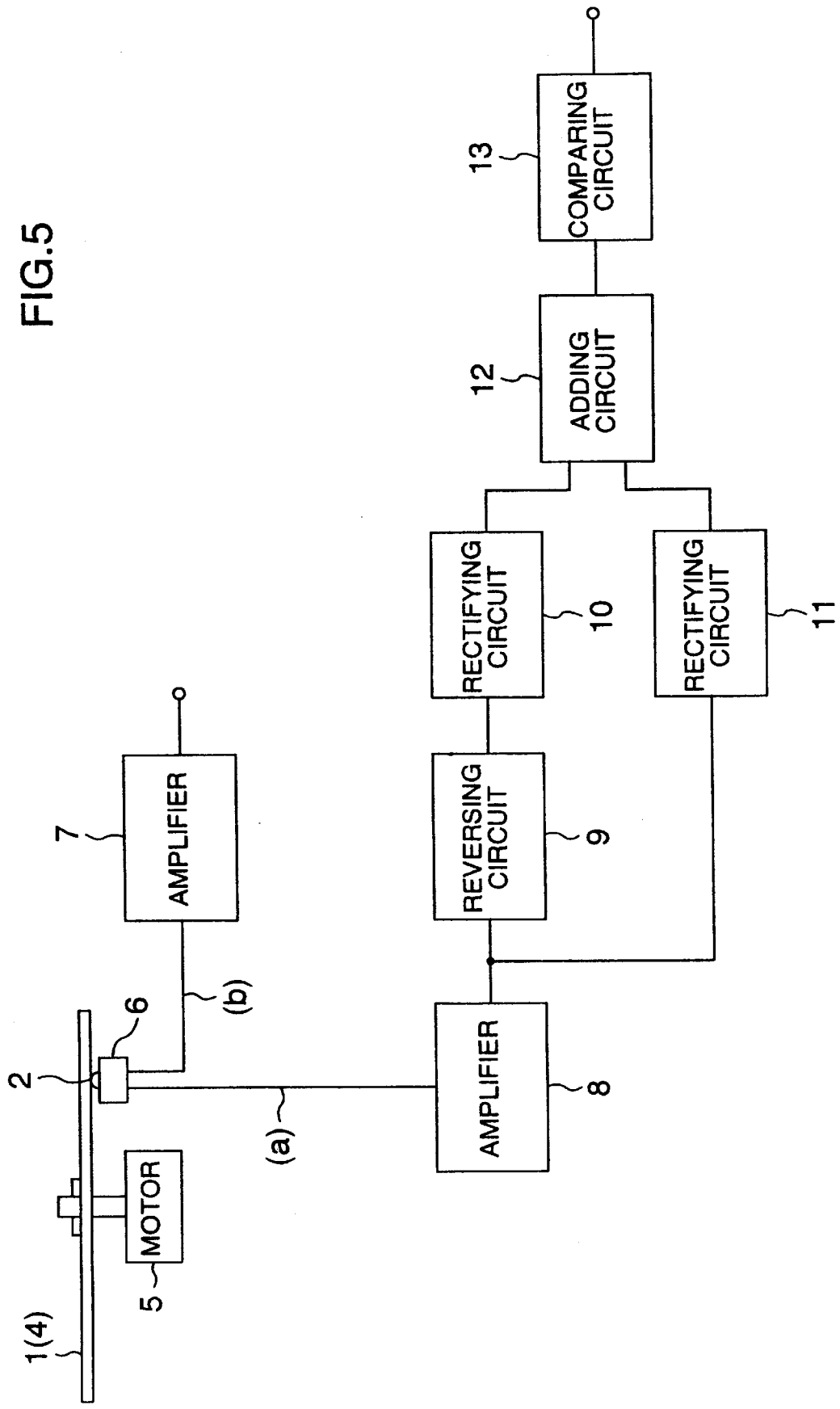

FIG.6(A) OUTPUT OF AMPLIFIER 8 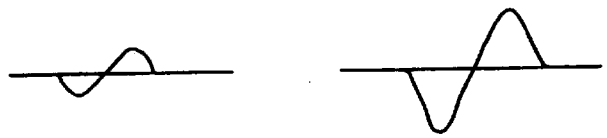
FIG.6(B) OUTPUT OF REVERSING CIRCUIT 9 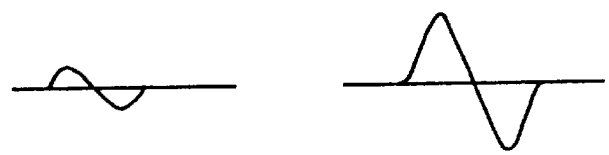
FIG.6(C) OUTPUT OF RECTIFYING CIRCUIT 10 
FIG.6(D) OUTPUT OF RECTIFYING CIRCUIT 11 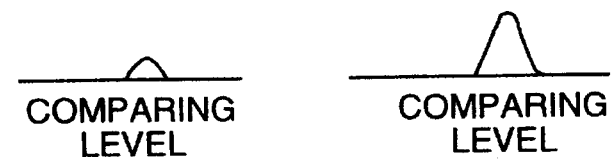
COMPARING LEVEL      COMPARING LEVEL
FIG.6(E) OUTPUT OF ADDING CIRCUIT 12 
FIG.6(F) OUTPUT OF COMPARING CIRCUIT 13 

METHOD AND APPARATUS FOR AUTOMATICALLY DISCRIMINATING TYPES OF OPTICAL DISKS

BACKGROUND OF THE INVENTION

The present invention relates to an optical disk apparatus which is arranged to optically reproduce a signal from a disk or record it thereon, and more particularly to the optical disk apparatus which enables to treat two or more kinds of disks whose recording planes have respective heights.

The commercially available optical disk apparatus is a compact disk (termed CD) player widely prevailed for reproducing music or a laser disk (termed LD) player. The compact disk and the laser disk have their own outer diameters and thicknesses but the same height, 1.2 mm, of the recording plane as each other. Hence, the common optical system may apply to both of the compact disk and the laser disk, so that the apparatus for reproducing both the CD and the LD has been merchandised. This sort of apparatus is "CLD-Z1" manufactured by Pioneer, Ltd, for example.

Today, there has been proposed a digital video disk (termed DVD) which has a higher recording density so that the DVD can record video data as well as audio data. For enhancing the recording density, the DVD needs a narrower track pitch, a shorter laser wavelength, and a greater numeral aperture (termed NA) of a lens than the CD. Concretely, for the DVD, the track pitch is 0.74 $\mu$m, the laser wavelength is 650 nm, and the lens numeral aperture is 0.60, while for the CD, the track pitch is 1.6 $\mu$m, the laser wavelength is 780 nm, and the NA of the lens is 0.4. The larger numeral aperture of the DVD results in disadvantageously reducing an allowable value of an angle shifted from the vertical of the disk plane against an optical axis of a light pick-up (tilt angle). In order to alleviate this disadvantage, if the DVD has the outer diameter of 120 mm which is the same as that of the CD, the height of the recording plane is 0.6 mm (the thickness of the two pasted disks is 1.2 mm) as compared with the height, 1.2 mm, of the CD (single disk). Hence, it looks like that the DVD disk is similar to the CD. In actual, however, both of the disks have respective standards. Apparently, the optical disk apparatus to be merchandised in near future is required to reproduce the data from the CD as well as the DVD.

Since the CD and the DVD have the different standards from each other, however, the optical disk apparatus is required to switch an optical system and a circuit system for the CD to those for the DVD or vice versa. This needs to discriminate which type of the disk is mounted to the apparatus when the disk is mounted thereto. That is, when a disk is mounted to the apparatus, the optical disk apparatus is requested to discriminate the type of the disk, the CD or the DVD, automatically switch the suitable optical and circuit systems transparently to the user, and properly record or reproduce the data on or from the mounted disk.

There is known JP-A-4-95224 disclosing a technique in that there are provided N (N≧2) optical disks having different thickness with each other and N light collecting optical systems in corresponding to the N optical disks, and one light collecting optical system among them is suitably selected in accordance with a certain optical disk by utilizing an identification hole of a cartridge receiving the optical disk and exist or absence of a tracking error signal. However, JP-A-4-95224 is quite silent on a technique for focusing in order to obtain the tracking error signal. JP-A-8-339569 shows an optical disk system in which objective lenses and the degrees of amplitude of amplifier are exchanged in accordance with the kinds of optical disks in order to obtain a stable reproduction, however a specific measure for discriminating the kinds of optical disks is never disclosed. Moreover, JP-A-3-116442 shows a technique in that the kinds of optical disk are discriminated as the whether the read only type optical disk or the random access type optical disk by utilizing the reflection ratio of the reflected light beam from the optical disk. However, JP-A-3-116442 could not discriminate as to whether CD or DVD by merely using the reflection ratio.

SUMMARY OF THE INVENTION

It is an object of the present invention to provide an optical disk apparatus which is arranged to automatically discriminate the DVD whose recording plane is 0.6 mm from the CD whose recording plane is located at a height of 1.2 mm before reproduction or recording and reproduction, switch the approximate optical and circuit systems to the discriminated disk, and reproduce the data from the discriminated disk or record and reproduce the data on or from the disk.

In carrying out the object, an optical disk apparatus according to an aspect of the invention includes an objective lens for adjusting a focus, the objective lens being moved perpendicularly to the disk plane before reproducing or recording and reproducing the data from the disk. A laser beam is applied onto the disk so that the type of the disk may be discriminated in response to the signal formed of light reflected on the disk. The optical disk apparatus provides optical systems which are adjustably applied to the disks whose recording planes are variable. Based on the discriminated result, the suitable optical system is selected for reproducing or recording and reproducing the data. Further, the circuit system may be switched in concert with the approximate optical system to the discriminated disk, because the DVD whose recording plane height is 0.6 mm needs a different processing system from the CD whose recording plane height is 1.2 mm.

BRIEF DESCRIPTION OF THE DRAWINGS

FIG. 1 is a sectional view showing a relation among a CD section for indicating a height of a recording plane, a laser light beam, and an objective lens in a conventional device;

FIGS. 2(A) and 2(B) are sectional views showing a relation among a DVD section for indicating a height of a recording plane, a laser light beam, and an objective lens in a conventional device;

FIG. 5 is a circuit diagram showing a circuit for discriminating the disks whose recording planes have respective heights;

FIGS. 6(A) to 6(F) are charts showing operating waveforms of several parts shown in FIG. 5;

DESCRIPTION OF THE PREFERRED EMBODIMENTS

Figure 3A:
FIGS. 3(A) and 3(B) are graphs showing observed waveforms of a radio frequency termed RF signal amplitude and a focus error termed FE signal appearing when a CD and a DVD are mounted to an optical system for CDs.

Later, the description will be oriented to embodiments of the present invention with reference to the drawings.

FIG. 1 shows the relation among one section of a conventionally familiar CD 1, a laser light beam 2, and an objective lens 3. The CD has a thickness of 1.2 mm. The recording plane of the CD is directed upward as viewed in FIG. 1. The height of the recording plane is located at a distance of about 1.2 mm as viewed from the spot where the laser light beam is applied. The laser wavelength for reproducing the data from the CD is close to 780 nm. The NA of the objective lens causing the most approximate light spot diameter is 0.45.

FIGS. 2(A) and 2(B) show the relation among one section of a DVD4, a laser light beam 2, and an objective lens 3. In order to enhance the density of the DVD as reducing the adverse effect of an aberration of a disk material, the disk has a thickness of 0.6 mm, and the same disks are pasted in a back-to-back manner. The total thickness of the resulting DVD is therefore 1.2 mm, which is the same as that of the CD. The DVD shown in FIG. 2(A) is composed of a data-recorded disk 41 and a dummy disk 42 pasted with each other, the dummy disk containing no data recorded thereon. The DVD shown in FIG. 2(B) is composed of the data-recorded disks pasted in a back-to-back manner. The disks are pasted because one disk is 0.6 mm in thickness and is not rigid enough to prevent the flexure of an outer peripheral side caused by lack of strength. The recording plane is contained in the DVD directed downward as viewed in FIG. 2(A), so that the recording plane is located at a height of about 0.6 mm. The laser wavelength for reproducing the DVD is 635 to 650 nm, and the NA of the objective lens is 0.6. This arrangement needs a different optical system from that of the CD. The diameter of the DVD is 120 mm which is the same as the CD because of considering the users handling of the disks. Therefore, the DVD and the CD are apparently similar in thickness and diameter to each other, so that the user has difficulty in discriminating the DVD from the CD. Further, though the both of the disks have the similar outer appearances, the recording plane of the DVD is located at a different height from that of the CD, and the DVD needs a different signal processing system from the CD. Hence, one reproducing apparatus or recording and reproducing apparatus needs the proper optical and circuit systems to the DVD and the CD.

According to the present invention, if the objective lens travels in a direction at right angles to the disk plane, a differences of a signal and a RF signal take place between the CD and the DVD. Based on the differences, the mounted disk is discriminated, CD or DVD, before reproduction. Based on the discriminated result, the optical and circuit systems are switched to the proper ones.

Figure 3B:
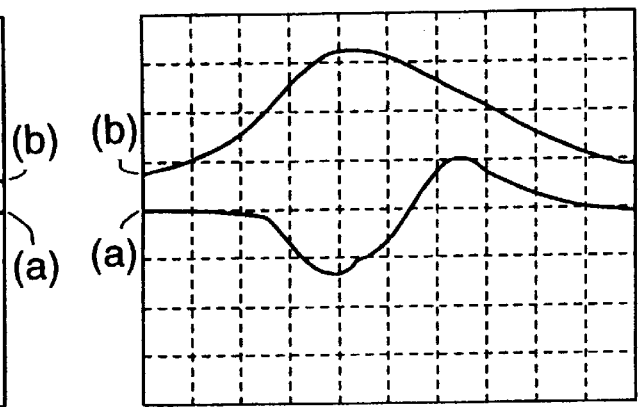

FIGS. 3(A) and 3(B) show the observed waveforms of the FE signal and the RF signal appearing in the process of travelling the objective lens orthogonally to the disk plane. FIG. 3(A) shows the waveforms of the CD. FIG. 3(B) shows the waveforms of the DVD. (a) denotes an FE signal and (b) denotes a RF signal. An axis of abscissa denotes a relative positional relation between a signal recording plane of the disk and the objective lens. The objective lens comes closer to the disk from left to right as viewed in FIGS. 3(A) and 3(B). As compared with the waveforms shown in FIGS. 3(A) and 3(B), the RF signals have the substantially same amplitude though both of the signals have different shapes, while the FE signals are conspicuously different from each other. In particular, the FE signal of the CD has a greater amplitude than that of the DVD.

Figure 4A:
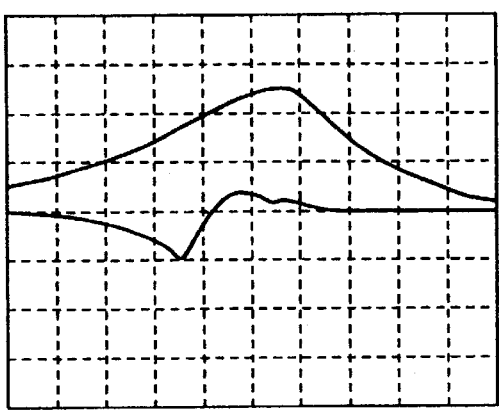
FIGS. 4(A) and 4(B) are graphs showing observed waveforms of a RF signal amplitude and a FE signal appearing when a CD or a DVD are mounted to an optical system for DVDs.
Figure 4B:
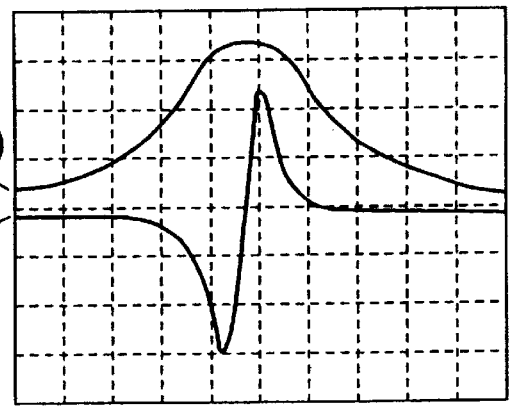

Likewise, in the optical system for the DVD, FIGS. 4(A) and 4(B) shows the observed waveforms of the FE signal and the RF signal appearing in the case of travelling the objective lens orthogonally to the disk planes of the CD and the DVD. The RF signal of the DVD has a greater amplitude than that of the CD. In particular, the amplitude of the FE signal takes place between the DVD and the CD. As is obvious from the FIGS. 3(A) and 3(B) and FIGS. 4(A) and 4(B), the CD can be discriminated from the DVD by determining a magnitude of the FE signal according to the levels.

FIG. 5 shows an example of a disk discriminating circuit. In the circuit, a motor 5 is a spindle motor for rotating the disk mounted to the apparatus. An optical system 6 contains the foregoing objective lens 6 and supplies the FE signal and RF signal to lines (a) and (b). A numeral 7 denotes an amplifier for the RF signal, the output of which is supplied to a signal processing circuit (not shown). The FE signal (a) is amplified by an amplifier 8 and then is sent to rectifying circuits 10 and 11 through an inverting circuit 9. The outputs of the rectifying circuits 10 and 11 are guided to a comparing circuit 13 through an adding circuit 12. The operating waveforms of these circuits are shown in FIGS. 6(A) to 6(F). The graphs at left hand side of FIGS. 6(A) to 6(F) show the output of each circuit when the FE signal has a small amplitude, while the graphs at right hand side of FIGS. 6(A) to 6(F) shows the output of each circuit when the FE signal has a large amplitude. For the portion E, the comparing level of the comparing circuit 13 is shown by a broken line. In the waveform shown in the left hand side graphs of FIGS. 6(A) to 6(F), the output level of the adding circuit 12 is smaller than the comparing level. Hence, the comparing circuit 13 outputs no signal. In the waveform shown in the right hand side graphs of FIGS. 6(A) to 6(F), the output level of the adding circuit 12 is larger than the comparing level at some portions. Hence, the comparing circuit 13 outputs two pulses. In order to discriminate the CD from the DVD, the two pulses are not required. The detection of the pulses is essential to discriminating the disks from each other.

Figure 7:
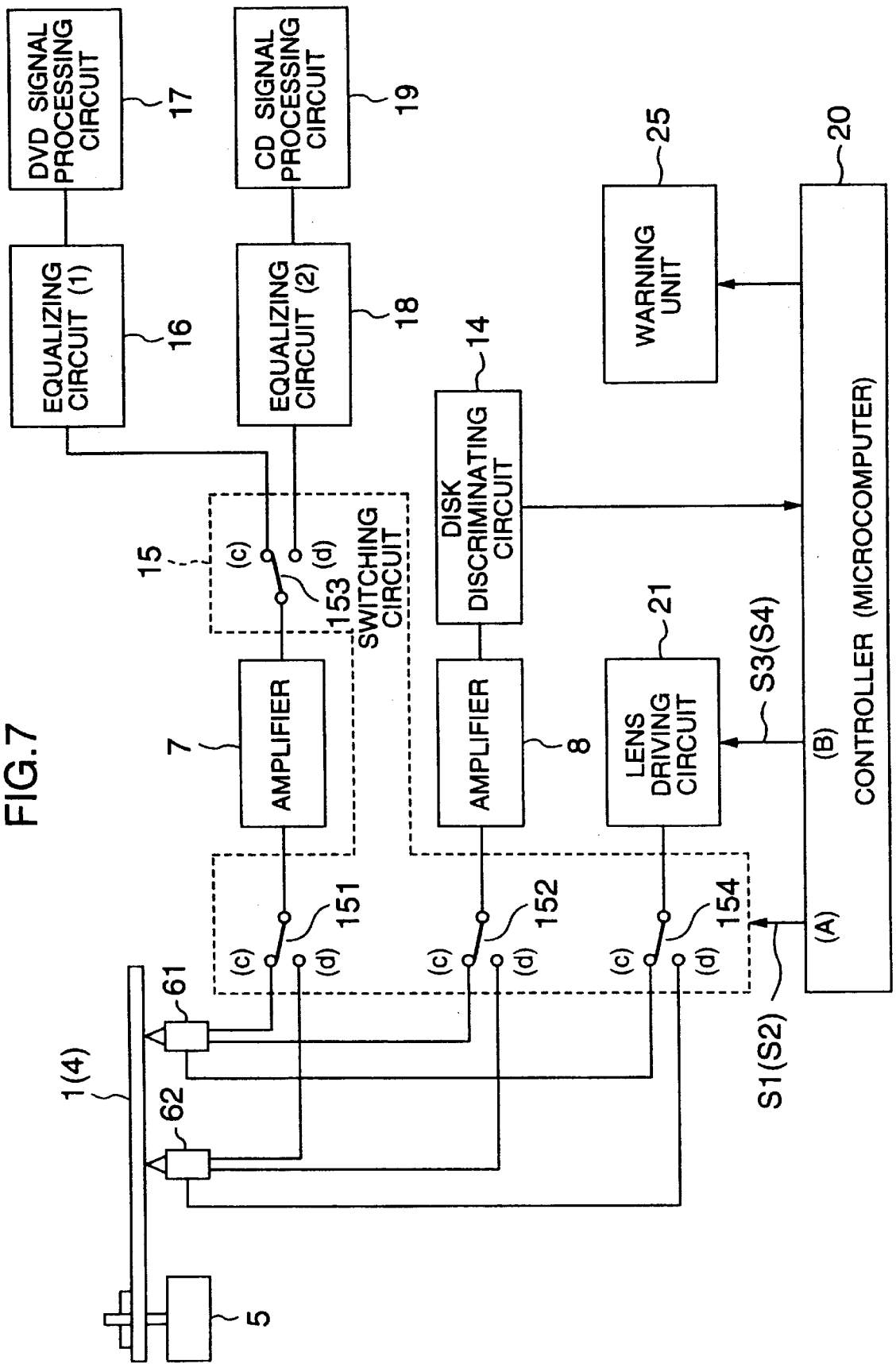
FIG. 7 is a circuit diagram showing an optical disk apparatus according to an embodiment of the present invention.
Figure 8:
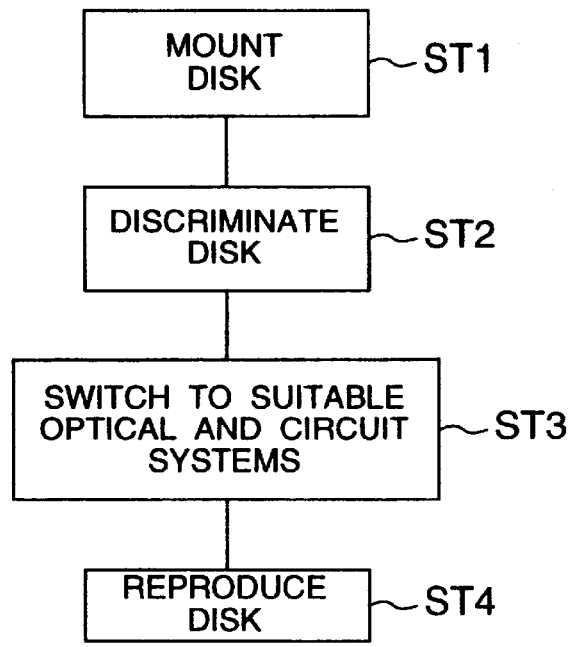
FIG. 8 is a flowchart showing a flow of time in the process of discriminating the disk and switching the optical system and the circuit system to proper ones.
Figure 9:
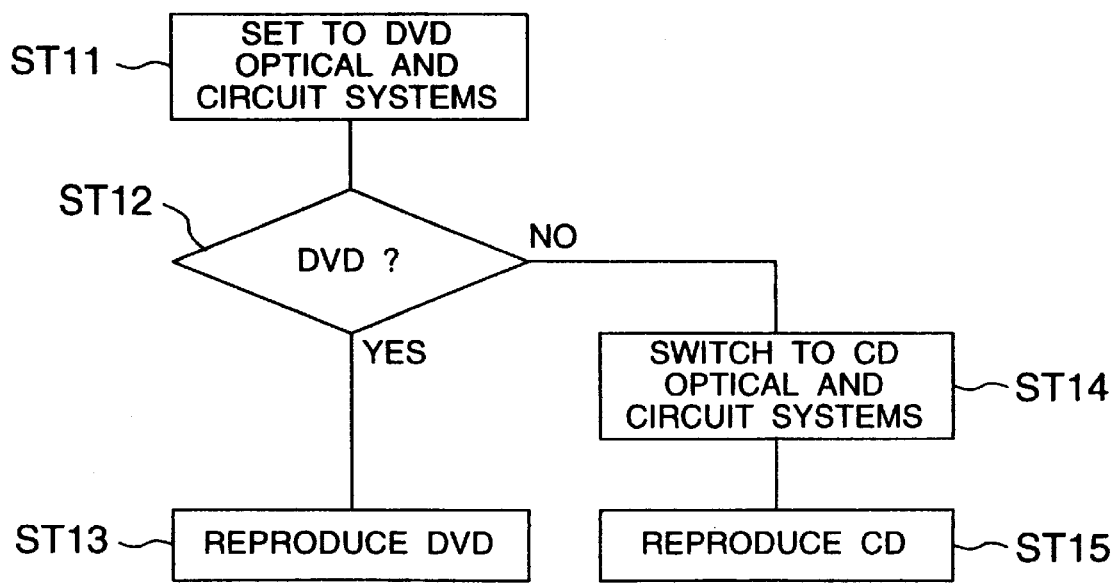
FIG. 9 is a flowchart showing a flow of time in the process of discriminating the disk and reproducing data from the disk.

As is obvious from the discriminating circuit shown in FIG. 5 and the operating waveform shown in FIGS. 6(A) to 6(F), when the CD is mounted to the optical system for the CD and when the DVD is mounted to the optical system for the DVD, the comparing circuit 13 supplies the pulses. On the other hand, when the CD is mounted to the optical system for the DVD and when the DVD is mounted to the optical system for the CD, the comparing circuit 13 supplies nothing. FIGS. 7, 8, and 9 show an optical disk apparatus according to an embodiment of the present invention, which will be discussed in detail. FIG. 7 shows the arrangement in which the optical system for the DVD 61 and the optical system for the CD 62 are independently provided. FIG. 8 shows an operation flow of the optical disk apparatus shown in FIG. 7. At a step ST1, when a disk is mounted to the apparatus, before reproducing the data from the disk at a step ST4, at a step ST2, the disk type is discriminated. Then, at a step ST3, the optical and circuit systems are switched to the proper ones. In the process of discriminating the disk type at the step ST2, as shown in FIG. 9, the optical and circuit systems are pre-set for the DVD, it is determined whether or not the mounted disk is the DVD, if it is, at a step ST13, the data is reproduced from the DVD. If it is not at the step ST12, at a step ST14, the optical and circuit systems are switched to the proper systems to the CD. Then, at a step ST15, the data is reproduced from the CD.

Figure 10:
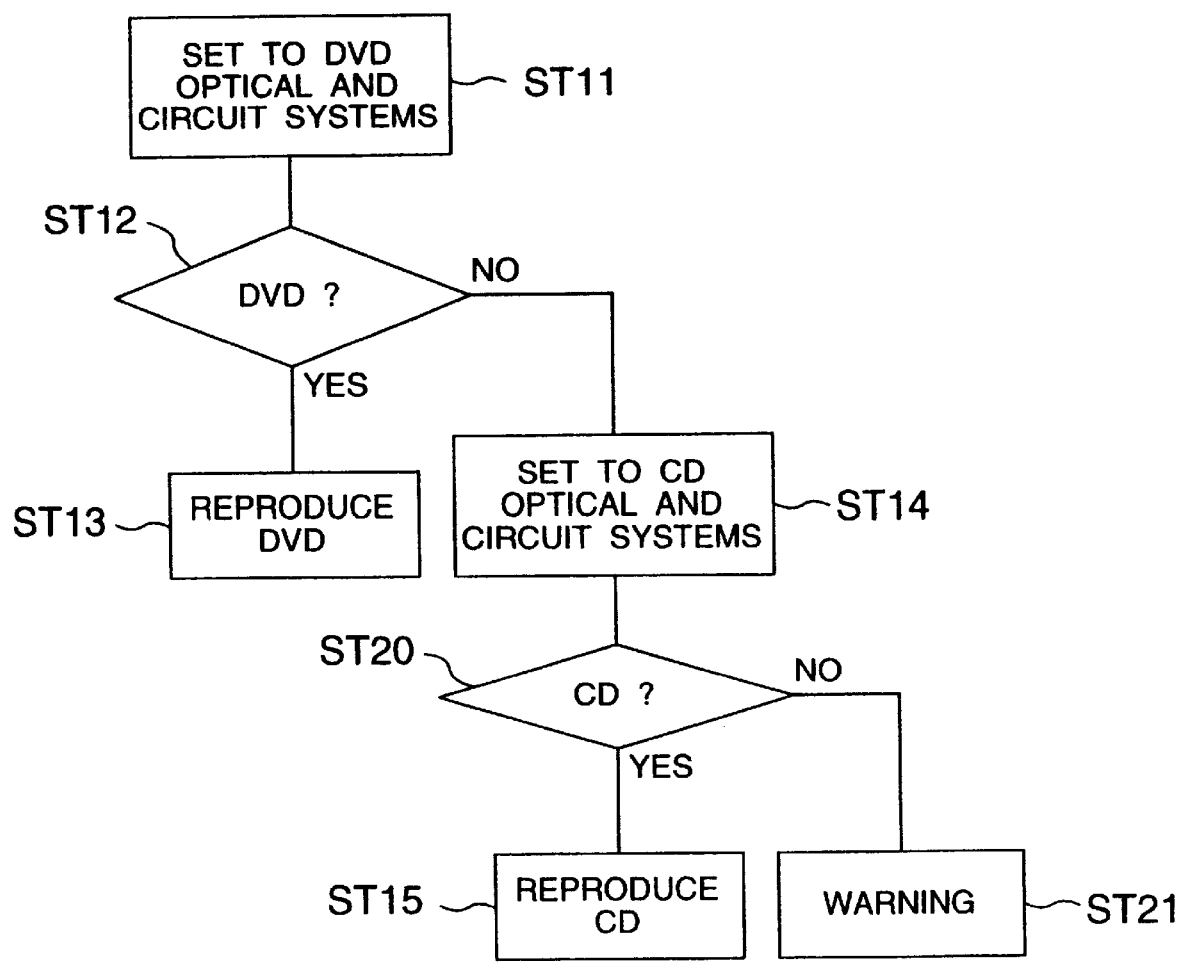
FIG. 10 is a flowchart showing another flow of time in the process of discriminating the disk and reproducing data from the disk.

In the operation shown in FIG. 9, if an indication for reproduction is issued when the mounted disk is neither the DVD nor the CD, it is mounted reversely, or no disk is mounted, a disadvantage takes place where no reproduction is carried out at a step ST 15. FIG. 10 shows an operating flow of the embodiment for overcoming the disadvantage. The flow of FIG. 9 is the same as the steps ST11 to ST14. At a step ST20, it is discriminated whether or not the mounted disk is the CD. If it is, at a step ST15, the data is reproduced from the CD. If, at the step ST20, it is not, it indicates that the disk is mounted reversely or is different from the DVD or the CD, at a step ST21, a warning is issued for prompting the user to mount another disk. This operation makes it possible for the user to reproduce the data from the disk transparently to the user. In FIG. 7, a switch group 15 includes a switch 151 for switching the RF signals supplied from the optical systems 61 and 62, a switch 152 for switching the FE signals, a switch 153 for switching the DVD signal processing circuit and the CD signal processing circuit, and a switch 154 for switching the driving signals for driving the objective lenses of the optical systems 61 and 62. A controller 20 composed of a microcomputer controls the operation of these switches. The actual apparatus needs to switch a servo circuit though it is not shown in FIG. 7. When the controller 20 supplies a control signal to the DVD optical and circuit systems at a port A, all the switches 151 to 154 are connected to the C side (that is, the DVD side). Then, when the controller 20 outputs a control signal to the driving circuit for driving the objective lens at a port B, the objective lens of the DVD optical system 61 is driven in a direction at right angles to the disk plane. The FE signal from the optical system 61 is guided through the amplifier 8 to a disk discriminating circuit 14 (which is a set of the inverting circuit 9 shown in FIG. 5, the rectifying circuits 10 and 11, the adding circuit 12, and the comparing circuit 13). The output of the disk discriminating circuit 14 is applied to the controller 20 so that the controller 20 can identify the existence of the pulses indicated at the portion F of FIG. 6. If the pulses are identified, it is determined that the DVD disk is mounted. Then, the operation goes to a reproducing operation. If no pulse is supplied from the disk discriminating circuit 14, (If no at the step ST12 of FIG. 9 or 10), the controller supplies a control signal at the port A so that the switches 151 to 154 are switched to the d side where the CD optical and circuit systems are located. The controller supplies a control signal at the port B so that a lens driving circuit 21 is enabled to move the objective lens for the CD optical system 62. The FE signal from the CD optical system 62 is sent to the amplifier 8 and the disk discriminating circuit 14 in which it is discriminated whether or not the disk is the CD (step ST20 of FIG. 10). If the disk discriminating circuit 14 supplies a pulse, the controller 20 identifies the pulse, and then the operation goes to the CD reproduction (step ST15 of FIG. 10). In the process of the step ST11 shown in FIG. 10, if it is determined that the disk is not the CD, it indicates that the disk is mounted reversely or the mounted disk is not the DVD or the CD. In this case, at the step ST21 of FIG. 10, the controller 20 issues a warning for reporting to the user that an abnormality takes place on the mounted disk. The warning may be a literary or acoustic indication or an automatic ejection of the disk from the apparatus.

Figure 11:
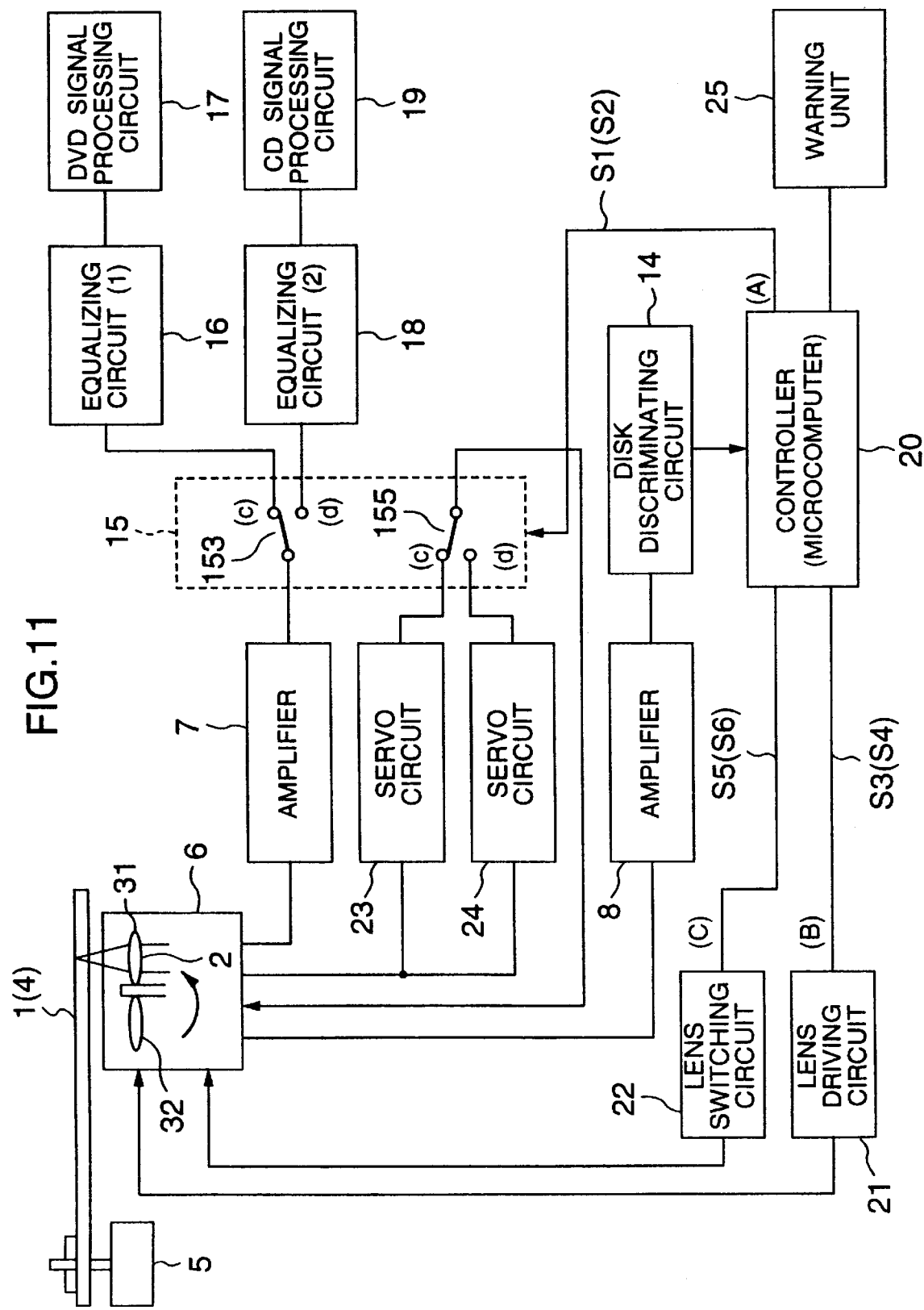
FIG. 11 is a circuit diagram showing an optical disk apparatus according to another embodiment of the present invention.

FIG. 11 shows an optical disk apparatus according to another embodiment of the present invention. The optical system 6 shown in FIG. 11 employs a system for switching an objective lens 31 for the DVD into an objective lens 32 for the CD or vice versa and includes a laser diode and the other optical components commonly used for both the CD and the DVD so that the optical system 6 is made inexpensive. The optical disk apparatus shown in FIG. 11 operates in a similar manner to the apparatus shown in FIG. 7 except that the controller 20 controls a lens switching circuit 29 for switching the DVD objective lens 31 to the CD objective lens 32 or vice versa, while the optical disk apparatus shown in FIG. 7 operates to switch the overall optical system 61 for the DVD into the overall optical system 62 for the CD or vice versa. FIG. 11 shows the simplified switching operation of a servo circuit though the servo circuit is not shown in FIG. 7. The servo circuit 23 indicates the servo circuit for the DVD, while the servo circuit 24 indicates the servo circuit for the CD. The controller 20 operates to supply a switching control signal to lines (A) and (C) so that the switches 153 and 155 of the switch group 15 are connected to the (c) side. This connection results in guiding a signal from a pick-up unit 6 to a signal processing circuit for the DVD 17 through an equalizing circuit 16 for the DVD 16 and thereby switching the servo circuit to that for the DVD. In response to a signal on the line (C), the lens switching circuit 22 switches an objective lens for the optical system 6 into the objective lens 31 for the DVD (This switching corresponds to the operation of the step ST11 shown in FIG. 10). Next, the controller 20 operates to supply a signal onto a line (B) so that the DVD objective lens 31 is moved orthogonally to the disk. The FE signal is sent to the disk discriminating circuit 14 through an amplifier 8. The disk discriminating circuit 14 operates to discriminate whether or not the mounted disk is a DVD (This corresponds to the operation at the step ST12 of FIG. 10). If it is, the disk is reproduced. (This corresponds to the operation at the step ST13 of FIG. 10). If it is not, the controller 20 operates to supply a switching control signal onto the lines (A) and (C) so that the switches 153 and 155 of the switch group 15 connect to the (d) side. This connection results in guiding the signal from the optical system 6 to the signal processing circuit for the CD 19 through the equalizing circuit for the CD 18 and thereby connecting the servo circuit into that for the CD 24.

In response to a signal on the line B, the lens switching circuit 22 operates to switch the objective lens of the optical system 6 into the objective lens for the CD 32. (This corresponds to the operation at the step ST14 of FIG. 10).

Next, the controller 20 operates to supply a signal on the line (B) so that the lens driving circuit 21 moves the objective lens for the CD 32 in a direction at right angles to the disk. Then, the FE signal is sent to the disk discriminating circuit 14 through the amplifier 8. Based on the FE signal, the disk discriminating circuit 14 operates to discriminate whether or not the mounted disk is a CD. (This corresponds to the operation at the step ST20 of FIG. 10). If it is, the disk is reproduced. (This corresponds to the operation at the step ST15.) If it is not, the controller 20 sends a warning signal to a warning unit 25 for reporting to the user that an abnormality takes place in the disk. (This corresponds to the operation at the step 21 of FIG. 10.)

Figure 12:
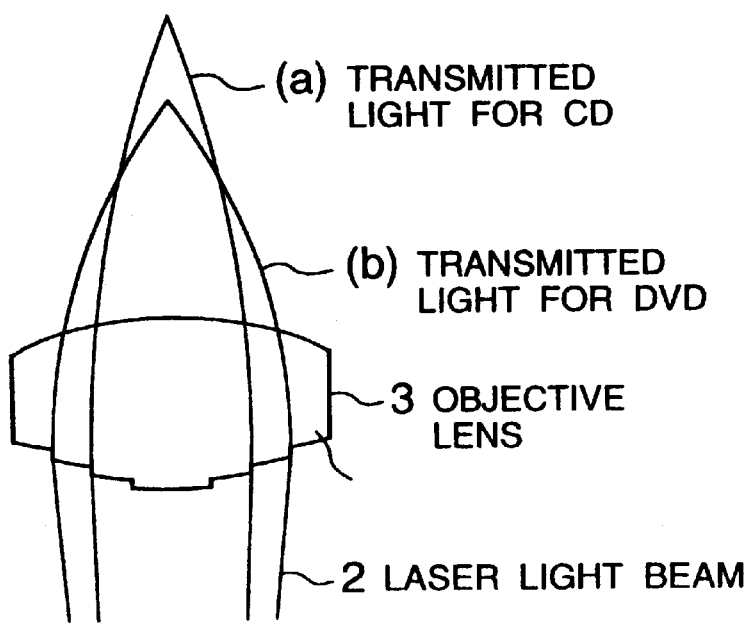
FIG. 12 is a view showing a relation between an objective lens with two focal points and a laser light beam.

Next, the description will be oriented to an optical disk apparatus according to another embodiment of the present invention, in which a single objective lens is focused on both the CD and the DVD and the disk is discriminated with the pick-up unit with two focal points. FIG. 12 shows an example of a pick-up unit with two focal points. The relation between the objective lens 3 and the laser beam 2 is exemplarily shown in FIG. 12. The objective lens 3 shown in FIG. 12 is composed of a lens and a hologram integrally formed therewith. The objective lens 3 forms a laser beam connecting a focal point (spot) of a transmitted light (a) with a focal point (spot) of a transmitted light (b).

Figure 13:
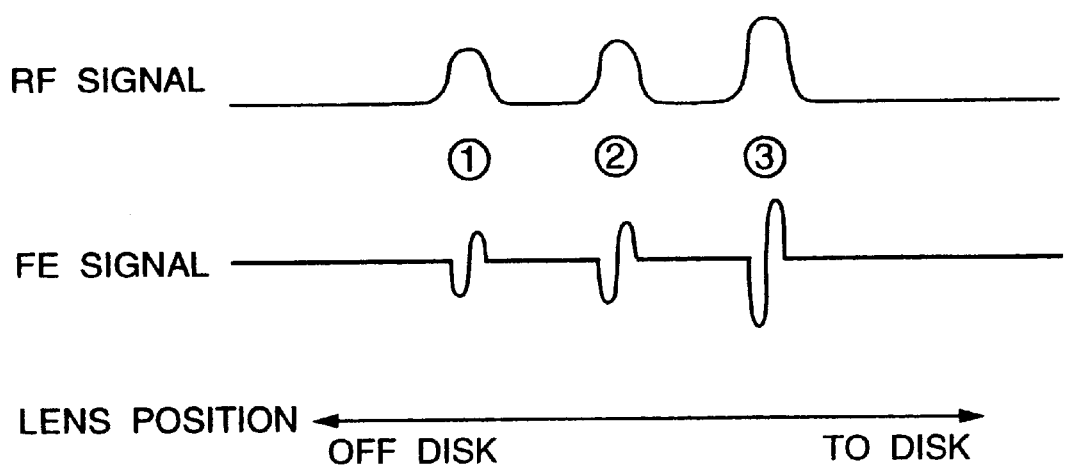
FIG. 13 is a chart showing a RF signal and a FE signal obtained in the case of travelling an objective lens with two focal points for the DVD in a direction at right angles to the DVD.

FIG. 13 shows the RF signal and the FE signal generated in the case of travelling the objective lens 3 toward the disk plane in a direction at right angles to the disk plane. FIG. 13 shows the waveforms of the DVD disk. As the objective lens 3 is coming closer to the disk, the spot of the CD transmitted light (a) shown in FIG. 12 reaches the signal recording plane, that is, the mirror plane of the disk. The reflected light causes the RF signal and the FE signal as shown by a reference number ① of FIG. 13. As the objective lens is coming much closer to the disk, the stray lights of the CD transmitted light (a) and the DVD transmitted light (b) are reflected on the disk, so that the resulting RF and FE signals indicated by the reference number ② of FIG. 13 appear. As the objective lens is coming far closer to the disk, the spot of the DVD transmitted light (b) shown by a reference number b of FIG. 12 reaches the mirror plane, so that the resulting RF and FE signals as indicated by a reference number ③ of FIG. 13 appear.

As the objective lens 3 is coming off the disk plane, the RF and the FE signals appear in the reverse order to the above, that is, the order of the reference numbers ③, ②, and ① of FIG. 13. The RF and the FE signals indicated by the reference number ① of FIG. 13 are brought about by the CD transmitted light (a) of FIG. 12 reflected onto the mirror plane of the DVD. Though the light originally forms the most approximate spot at a disk thickness of 1.2 mm, the light actually forms the spot at a disk thickness of 0.6 mm. The optical astigmation makes the spot blur, so that the quantity of the reflected light is small. Hence, the RF and the FE signals indicated by the reference number ① of FIG. 13 are smaller than these signals indicated by the reference number ③ caused by the DVD transmitted light (b) of FIG. 12 which forms a spot on the mirror plane of the DVD.

Figure 14:
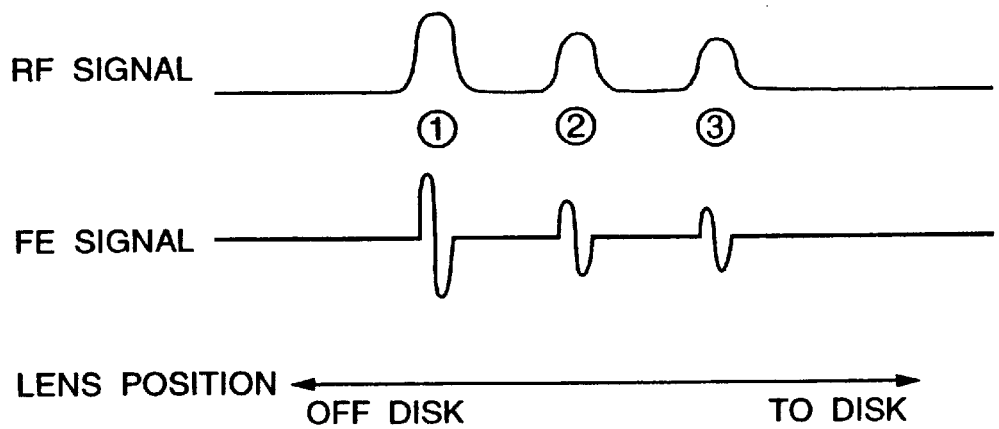
FIG. 14 is a chart showing a RF signal and a FE signal obtained in the case of travelling an objective lens with two focal points for the CD in a direction at right angles to the CD.
Figure 15:
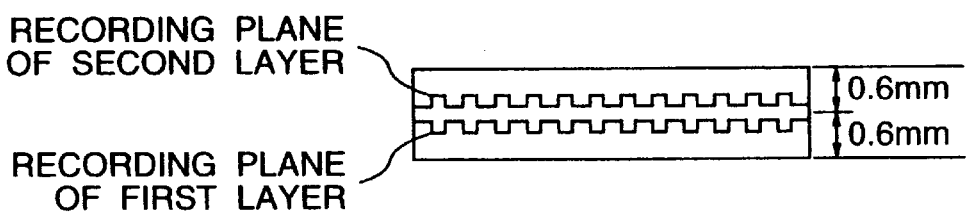
FIG. 15 is a sectional view for describing the method for reproducing data from the DVD having two recording plane layers on one side of the DVD.

FIG. 14 shows the RF and the FE signals appearing if the objective lens 3 with two focal points is coming closer to the CD disk. The RF and the FE signals indicated by the reference number ① of FIG. 14 are larger than those signals indicated by the reference number ③ of FIG. 14.

The DVD may contain a semi-transparent film as the first recording layer and a reflective film as the second recording layer. This type of DVD contains two-layered information recording planes on one side.

Figure 16:
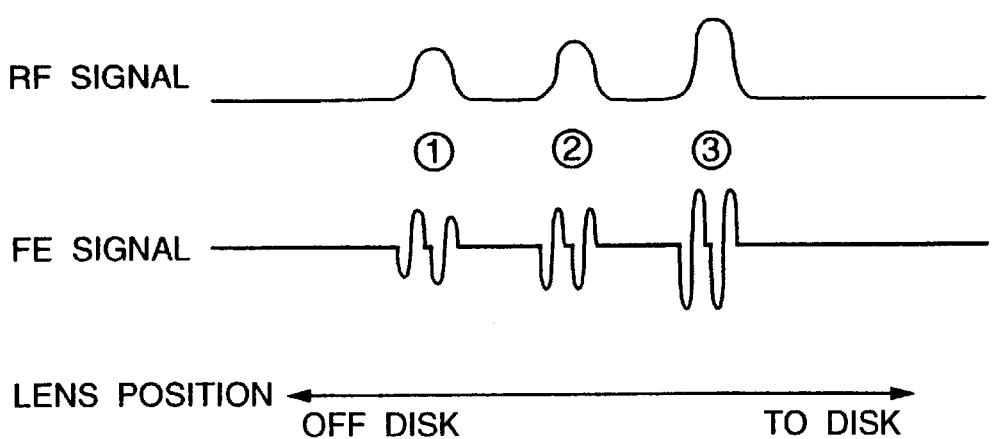
FIG. 16 is a chart showing a RF signal and an FE signal obtained in the process of travelling an objective lens with two focal points to the DVD having dual layers on one side of the DVD.

FIG. 16 shows the RF and the FE signals appearing if the objective lens 3 with two focal points shown in FIG. 12 is coming closer to the disk with two layers on one side. The RF and the FE signals shown in FIG. 16 are basically the same as those shown in FIG. 13, except that a pair of FE signals are detected at the spots represented by reference number ①, ②, and ③. Hence, the RF and the FE signals indicated by a reference number ③ are larger than those by a reference number ①. In this case, the magnitude of the measured FE signal is more than the magnitude of the RF signal as shown in FIGS. 3 and 4. The type of the disk can be discriminated on the magnitude of the FE signal indicated by the reference numbers ① and ③ of FIG. 16 and the number, 1 or 2, of the FE signals. The discriminating conditions are listed in the following Table 1.

TABLE 1

| | DISCRIMINATING CONDITIONS | | |
|---|---|---|---|
| TYPE OF DISK | NUMBER OF RF | RELATION OF FE SIGNAL | NUMBER OF FE SIGNALS OF ③ |
| CD | 3 | FE SIGNAL OF ① > FE SIGNAL OF ③ | 1 |
| DVD (SINGLE LAYER) | 3 | FE SIGNAL OF ① < FE SIGNAL OF ③ | 1 |
| DVD (DUAL LAYER) | 3 | FE SIGNAL OF ① < FE SIGNAL OF ③ | 2 |
| NO DISK | 0 | — | — |
| ERROR DISK | | EXCEPT THE ABOVE | |

In Table 1, if no disk is mounted, no reflected light takes place, so that no RF signal is caused (that is, the number of RFs is 0), when it is determined that no disk is mounted. That is, the absence of the disk is determined. Except this, it is determined that the mounted disk is any other than the CD or the DVD or the disk is reversely mounted. Hence, an error disk is indicated.

With reference to FIGS. 12, 13, 14, 15, and 16 and Table 1, the description will be oriented to the embodiments in which the type of the disk is discriminated by the objective lens with two focal points. After determining the type of the disk, it goes without saying that the optical system and the circuit system for the mounted disk are selected so that the mounted disk is reproduced like the embodiments shown in FIGS. 7, 8, 9, 10, and 11.

The aforementioned embodiments of the present invention have been arranged to move the objective lens 3 in a direction at right angles to the disk plane. Moving the objective lens once makes the disk discrimination possible only if the focal point of the laser light beam positively passes through the recording plane of the disk. In the case of moving the objective lens closer to the disk for discriminating the disk, it is better to move the objective lens to a predetermined location where the focal point of the laser light beam positively passes through the recording plane of the disk. This holds true to the disk discrimination executed by moving the objective lens off the disk.

The embodiment of the present invention has concerned with the discrimination determined by one discriminating operation. However, a single discriminating operation is executed to erroneously discriminate the disk if the disk is impaired. In order to avoid the erroneous discrimination, it is possible to repeat the discriminating operation several times, total the discriminated results, and finally discriminate the disk by the decision by majority for preventing an erroneous operation and enhancing the certainty.

The foregoing embodiments have been concerned with the reproduction of the CD and the DVD. These embodiments may apply to the recording as well as the reproduction. They are useful of the reproduction (-dedicated) apparatus and the recording and reproducing apparatus.

For discriminating the disk are used the FE and the RF signals caused when the objective lens is moved in a direction at right angles to the disk plane. The other method may be used for the purpose.

As set forth above, the optical disk apparatus according to the present invention has been arranged to automatically select the suitable optical system and circuit system to one of two or more types of disks whose recording planes have respective heights. Hence, the object disk is allowed to be reproduced or recorded transparently to the user, that is, unless the user does a special operation to the sort of disk. In particular, in a case that like the CD and the DVD both of the disks have the same outer appearances, concretely, the same diameter of 120 mm and the same thickness of 1.2 mm but have their respective recording plane heights, concretely, the CD has a recording plane height of 1.2 mm and the DVD has a recording plane height of 0.6 mm, the user cannot identify each disk from the outer appearance. The optical disk apparatus according to the present invention enables to reproduce or record the data from or on the object disk transparently with the user, that is, without the users consciousness of the type of disk.

What is claimed is:

1. A method of automatically discriminating different types of optical disks having different heights of a recording plane before reproducing from or recording onto the optical disks, the method comprising the step of;

discriminating the type of the optical disk by comparison of plural signals detected from reflected lights of a respective optical disk obtained through each of a plurality of optical systems with one another, each of said plurality of optical systems being adapted to reproducing from or recording onto the different types of optical disks, respectively.

2. A method automatically discriminating different types of optical disks according to claim 1, wherein the type of each of the optical disks is discriminated by comparing the amplitudes of the plural signals obtained from the reflected lights of the optical disk.

3. A method of automatically discriminating different types of optical disks according to claim 1, wherein the plural signals are focus error signals and the type of each of the optical disks is discriminated by comparing the amplitudes of the focus error signals obtained from the reflected lights of the optical disk.

4. A method of automatically discriminating different types of optical disks according to claim 1, wherein the type of each of the optical disks is discriminated by effecting the discriminating step plural times and utilizing the results of the plural discriminating steps.

5. A method of automatically discriminating types of optical disks according to claim 1, wherein the type of each of the optical disks is discriminated by focusing laser beams on the surface of a respective optical disk by moving an objective lens in a vertical direction and using the plural signals reflected from the optical disk.

6. A method of automatically discriminating types of optical disks according to claim 1, wherein the optical systems have a common single objective lens for the optical systems.

7. A method of automatically discriminating types of optical disks according to claim 6, wherein the common single objective lens has different focus points.

8. A method of automatically discriminating different types of optical disk according to claim 1, wherein the plural signals are focus error signals.

9. An optical disk apparatus comprising:

an electric motor for rotating an optical disk of different types having different heights of a recording plane;

a plurality of optical systems adapted to the different types of optical disks for radiating a laser beam onto the optical disk and outputting a signal obtained from a reflected light from the optical disk; and an optical disk discriminating circuit for automatically discriminating the type of the optical disk by comparing the signal outputted from each of the plurality of optical systems for the optical disk with one another.

10. An optical disk apparatus according to claim 9, wherein the signal is a focus error signal.

11. An optical disk apparatus for at least one of reproducing information from an optical disk and recording information on the optical disk comprising:

an electric motor for rotating an optical disk of different types having different heights of the recording plane, a plurality of optical systems adapted to the different types of optical disks for radiating a laser beam onto the optical disk and outputting a signal obtained from a reflected light from the optical disk, and an optical disk discriminating circuit for automatically discriminating the types of the optical disk by fetching each of the signals outputted from the plurality of optical systems for the optical disk and comparing the signals with one another, and a switching circuit for selecting a single optical system adapted to the optical disk discriminated by the optical disk discriminating circuit, wherein the at least one of reproducing and recording is effected through the selected single optical system.

12. An optical disk apparatus according to claim 11, wherein the signals outputted from the plurality of optical systems are focus error signals.

* * * * *